(12) United States Patent
Durazzo et al.

(10) Patent No.: US 7,957,335 B2
(45) Date of Patent: Jun. 7, 2011

(54) DYNAMIC POWER USAGE MANAGEMENT BASED ON HISTORICAL TRAFFIC PATTERN DATA FOR NETWORK DEVICES

(75) Inventors: Kenneth Durazzo, San Ramon, CA (US); Andrew G. Harvey, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 956 days.

(21) Appl. No.: 11/844,325

(22) Filed: Aug. 23, 2007

(65) Prior Publication Data

US 2009/0052372 A1   Feb. 26, 2009

(51) Int. Cl.
*H04B 7/185* (2006.01)
(52) U.S. Cl. .................... 370/318; 370/230.1; 455/205
(58) Field of Classification Search .............. 370/229, 370/230, 230.1, 318, 356, 395.21; 713/1, 713/300; 455/405, 450, 452.14
See application file for complete search history.

(56) References Cited

U.S. PATENT DOCUMENTS

| | | | | |
|---|---|---|---|---|
| 6,256,490 | B1 * | 7/2001 | Yost et al. | 455/405 |
| 6,347,224 | B1 * | 2/2002 | Smyth et al. | 455/406 |
| 7,710,871 | B2 * | 5/2010 | Lavian et al. | 370/230 |
| 7,787,416 | B2 * | 8/2010 | Gidwani | 370/329 |

OTHER PUBLICATIONS

EPA—"Energy Star-The Power to Protect the Environment Through Energy Efficiency" obtained on the Internet http://www.energystar.gov/ia/partners/downloads/energy_star_report_aug_2003.pdf; 16 pages.

* cited by examiner

*Primary Examiner* — CongVan Tran
(74) *Attorney, Agent, or Firm* — Fish & Richardson P.C.

(57) ABSTRACT

Particular embodiments provide power usage management for network devices according to historical traffic pattern data. Network traffic statistics for traffic flowing through a network device may be determined. A traffic pattern for a time period based on the traffic flowing through the network device is then determined. The network device may then manage power based on the pattern. For example, when a pattern indicates that traffic flowing through the network device is light during a time period, then the network device may operate in a lower power mode, such as a standby mode and when it indicates that there is higher usage, the network device may operate in a normal power mode. In one embodiment, a power usage policy may be determined based on the historical traffic patterns and is automatically enforced by the network device. The power usage policy may also be dynamically adjusted over time based on network traffic statistics.

24 Claims, 4 Drawing Sheets

DYNAMIC POWER USAGE MANAGEMENT BASED ON HISTORICAL TRAFFIC PATTERN DATA FOR NETWORK DEVICES

TECHNICAL FIELD

Particular embodiments generally relate to power management.

BACKGROUND

Network equipment platforms operate at one power consumption level. For example, if a platform has a 300 watt power supply, it is drawing power at that level regardless if it is using that power to transfer packets.

There are also home appliances, such as dishwashers, washers and dryers, etc., that may be EnergyStar™ compliant. These appliances may be more energy efficient than their predecessors. For example, they may include circuitry that operates in a more efficient manner than the circuitry of predecessor appliances. However, a certain level of power is still continuously used no matter how the appliance is operating. The appliances just use less energy when operating than previous appliances.

DESCRIPTION OF EXAMPLE EMBODIMENTS

Overview

Figure 1:
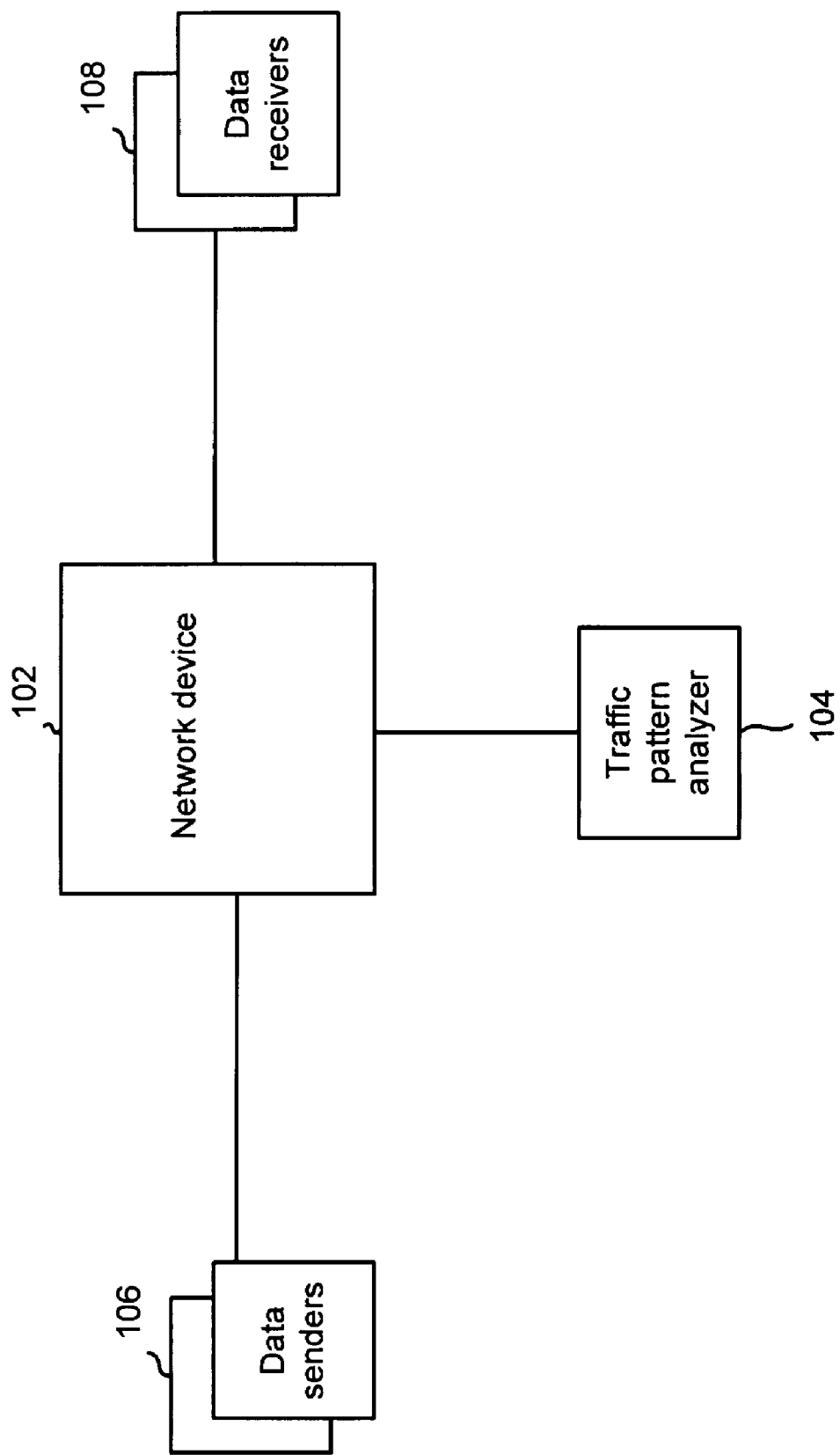
FIG. 1 depicts an example of a system for providing power usage management.

Particular embodiments provide power usage management for network devices according to historical traffic pattern data. Network traffic statistics for traffic flowing through a network device may be determined. A traffic pattern for a time period based on the traffic flowing through the network device is then determined. For example, it may be determined that from 9 a.m.-5 p.m. on Monday, there is high traffic use but from 5 p.m.-12:00 p.m., there is low traffic use. Also, on Tuesday, there may be low traffic use from 12:01 a.m. to 10:00 a.m. followed by a period of high traffic use from 10:00 a.m. to 8:00 p.m. These patterns may be determined based on the network traffic statistics. The network device may then manage power based on the pattern. For example, when a pattern indicates that traffic flowing through the network device is light during a time period, then the network device may operate in a lower power mode, such as a standby mode. When the traffic pattern indicates that there is higher usage, then the network device may operate in a normal power mode. In one embodiment, a power usage policy may be determined based on the historical traffic patterns and is automatically enforced by the network device. The power usage policy may indicate when the network device should operate in a lower power mode or a higher power mode. The power usage policy may be dynamically adjusted over time based on network traffic statistics. For example, every day, week, month, etc., the network traffic statistics may be evaluated and a new power usage policy may be determined and enforced on the network device.

In one embodiment, a method is provided that comprises: determining network traffic statistics for traffic flowing through a network device; providing the network device with traffic pattern information based on the network traffic statistics for traffic flowing through the network device, the traffic pattern information allowing for power usage management to be performed where the network device operates in a lower power mode when the traffic pattern information indicates a traffic pattern associated with lower usage; and dynamically providing the network device with updated traffic pattern information based on new network traffic statistics to allow the network device to adjust its power usage management.

In another embodiment, a method is provided that comprises: determining network traffic statistics for traffic flowing through a network device; determining traffic pattern information, the traffic pattern information determined based on the traffic flowing through the network device; performing power usage management by operating in a lower power mode during one or more first time periods when the traffic pattern information indicates a traffic pattern associated with lower usage and operating in a higher power mode during one or more second time periods when the traffic pattern information indicates a traffic pattern associated with higher usage; and dynamically changing the power usage management by changing at least one of the one or more first time periods and/or the one or more second time periods of operating in the lower power mode and higher power mode based on new traffic pattern information determined from new network traffic statistics.

In yet another embodiment, an apparatus is provided comprises: one or more processors; and logic encoded in one or more tangible media for execution by the one or more processors and when executed operable to: determine network traffic statistics for traffic flowing through a network device; provide the network device with traffic pattern information based on the network traffic statistics for traffic flowing through the network device, the traffic pattern information allowing for power usage management to be performed where the network device operates in a lower power mode when the traffic pattern information indicates a traffic pattern associated with lower usage; and dynamically provide the network device with updated traffic pattern information based on new network traffic statistics to allow the network device to adjust its power usage management.

In another embodiment, an apparatus is provided that comprises: one or more processors; and logic encoded in one or more tangible media for execution by the one or more processors and when executed operable to: determine network traffic statistics for traffic flowing through a network device; determine traffic pattern information determined based on the traffic flowing through the network device; perform power usage management by operating in a lower power mode during one or more first time periods when the traffic pattern information indicates a traffic pattern associated with lower usage and operating in a higher power mode during one or more second time periods when the traffic pattern information indicates a traffic pattern associated with higher usage; and dynamically change the power usage management by changing at least one of the one or more first time periods and/or the one or more second time periods of operating in the lower power mode and higher power mode based on new traffic pattern information determined from new network traffic statistics.

Example Embodiments

FIG. 1 depicts an example of a system for providing power usage management. The system includes a network device 102, a traffic pattern analyzer 104, a plurality of data senders 106, and a plurality of data receivers 108. Although one network device 102 is shown, it will be understood that many network devices may use the power usage management techniques as described in particular embodiments. Also, although traffic pattern analyzer 104 is shown as being separate from network device 102, it will be understood that it may be integrated with network device 102 or functions described with respect to traffic pattern analyzer 104 may be distributed to network device 102.

Network device 102 may be any device that is configured to process data. For example, network device 102 may process network traffic. The network traffic may be processed in terms of received data/sent data. In one embodiment, the input/output of data may be measured in packets received/packets sent and/or bytes received/bytes sent, etc. Network device 102 may be a network equipment platform or be part of one. A network equipment platform may be one or more network devices that are configured to process data. Examples of network device 102 include a router, switch, server, or any other computing device.

Data senders 106 and data receivers 108 send and receive data. For example, data senders 106 and data receivers 108 may be end devices in a network, such as voice over Internet protocol (VoIP) telephones, personal computers, set top boxes, etc. Also, they may be other routers, switches, servers, etc. Data senders 106 send data to network device 102. Network device 102 may then send at least a portion of the data to data receivers 108. For example, network device 102 may be routing packets as is known in the art.

Traffic pattern analyzer 104 is configured to receive network traffic statistics for the traffic flowing through network device 102. For example, a history of how many packets were received and sent by network device 102 may be determined. Traffic pattern analyzer 104 then can determine a traffic pattern based on the traffic flowing through the network device. For example, the traffic pattern may be different levels of usage during different time periods. In one example, the patterns may be categorized in hourly, daily, monthly, yearly, daily, etc. windows. Network device 102 then manages power usage based on the patterns. For example, a power usage policy is determined. The power usage policy may manage power depending on when various traffic patterns are observed. For example, the policy may power down network device 102 to a lower power level during periods of low activity and power up network device 102 during periods of higher activity.

The power usage management may be dynamically adjusted over time. For example, network traffic statistics may be continuously monitored. As patterns change, the power usage policy may be dynamically updated. For example, network device 102 may power down to a lower power level at different times based on the new traffic patterns observed.

Traffic pattern analyzer 104 may be separate from network device 102. A sync of network traffic statistics may occur at determined times, such as network device 102 may send the statistics daily to traffic pattern analyzer 104. Also, traffic pattern analyzer 104 does not have to be separate from network device, such as traffic pattern analyzer 104 may be software module in network device 102 that receives (or monitors) the network traffic statistics. Network device 102 also does not have to monitor the network traffic statistics itself. For example, another network device may determine the statistics for network device 102, such as another network device at an end of a link with network device 102 may monitor the number of packets received from network device 102. For example, network device 102 may have to send packets through a gateway and the gateway can determine the number of packets sent by network device 102. The other network device reports the network traffic statistics to traffic pattern analyzer 104, which can then determine the pattern based on the statistics. By offloading traffic pattern analyzer 104, computing resources may be saved at network device 102 because it does not need to analyze the network traffic statistics.

In one example, network device 102 may be found in a platform. Network traffic analyzer 104 may include software that is configured to adjust the power consumption of network device 102 in the platform. A historical sample of data, such as a month's worth of data, may be determined. A history of data traffic patterns for time periods may then be determined. For example, hourly, daily, weekly, monthly traffic patterns may be determined. Traffic patterns may then be sent to network device 102. For example, a daily sync to network device 102 may be provided with the observed traffic patterns. Network device 102 would then determine when to manage power consumption based on the traffic patterns. For example, if the traffic patterns indicate high usage, then network device 102 would be operating in a normal power mode. Also, when traffic patterns indicate low use, then network device 102 may power down to a lower power mode of operation.

Figure 2:
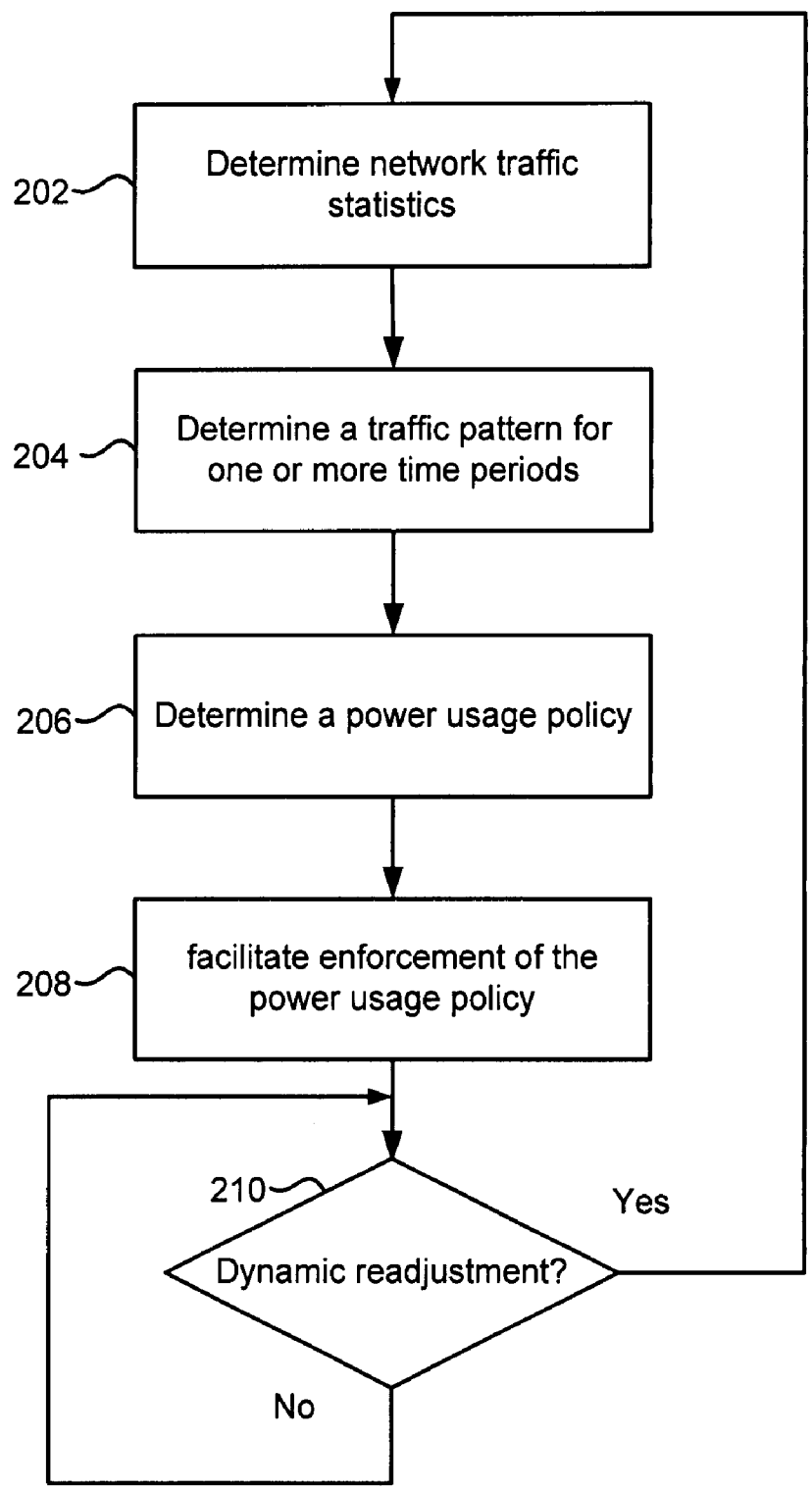
FIG. 2 depicts an example of a method for determining a power usage policy.

FIG. 2 depicts an example of a method for determining a power usage policy. In one embodiment, traffic pattern analyzer 104 performs the method.

In step 202, traffic pattern analyzer 104 determines network traffic statistics. In one embodiment, the network traffic statistics may be received in the form of a daily sync from network device 102 to traffic pattern analyzer 104. The sync may also be performed at other intervals.

In step 204, traffic pattern analyzer 104 determines a traffic pattern for one or more time periods. For example, the patterns determined may be within certain windows of time, such as hourly, daily, weekly, etc. It may not be efficient to frequently switch a network device between power modes. Thus, traffic pattern analyzer 104 may determine patterns that occur over a longer time period, such as in terms of hours. Spikes or aberrations in usage may be ignored over a sample period (e.g., a month's worth of data) such that efficient power usage is provided where a pattern of defined usage (e.g., low usage) can be determined over a time interval. For example, if N packets are transferred over eight hours, this may be considered a pattern of low usage. However, if over N packets are transferred in the eight hours, then this may be a pattern of higher usage.

In step 206, a power usage policy is determined. The power usage policy may be used by network device 102 to determine when to vary power. For example, if the traffic pattern indicates a low transfer rate of packets received/sent during a time period, then the policy may indicate that network device 102 should operate in a lower power mode, such as a standby mode or powered off. The usage over time may be compared to a threshold to determine if it is considered low or high. For example, if the usage is below a threshold, then it is considered low. The lower power mode of operation may be any level of operation that is less than the normal or full level of operation. If the power supply for network device 102 is 300 V, the lower power mode may draw power at a lower level than 300 V. Also, in traffic patterns that show higher usage, then the policy indicates that network device 102 should operate in a normal power mode. The normal power mode may be a power mode that draws maximum power from a power supply. Also, the normal power level may just be higher than the lower power level. It should be noted that the policy may indicate many different levels of power usage. For example, depending on the traffic pattern, different levels of power may be provided. In one example, at some points, network device 102 may be off, then may be powered to a 1st power level, then to a 2nd power level, and so on.

In step 208, traffic pattern analyzer 104 facilitates enforcement of the power usage policy. For example, the policy is sent to network device 102, which can then determine when to manage its power based on the policy. The policy may indicate windows of time where network device 102 should operate in the lower power mode of operation. Although a power usage policy is described, it will be understood that any method of determining when to manage power for network device 102 is covered by the power usage policy. For example, once the traffic pattern is determined, network device 102 may be configured to determine when to operate in a lower power mode based on the traffic pattern. The traffic pattern may be sent to network device 102 indicating which time periods constitute high and low use. Then, network device 102 is configured to manage power based on the patterns. Also, many network devices 102 may interpret the data and adjust their power accordingly. For example, some network devices 102 may be considered critical and are only powered to a half power level when the pattern indicates very low usage, while some network devices move a standby mode.

Step 210 determines if dynamic readjustment of the power usage policy is needed. For example, particular embodiments may be continuously monitoring network traffic that flows through network device 102. When traffic patterns change, then the power usage policy may be dynamically altered. For example, after a certain time period, such as a week or month, the policy may be readjusted based on additional network traffic data that is received. In this case, the method reiterates to step 202 and a new power usage policy is determined.

If it is not time to dynamically readjust the power usage policy, the process reiterates to step 210 where it waits until dynamic readjustment should be performed. In some cases, the new data may indicate that a change in the policy is necessary because traffic patterns change. For example, at some point, usage may increase during a period defined as a low usage period in the policy. In one example, the usage may go above a certain threshold for a certain amount of time. Traffic pattern analyzer 104 may note the new pattern, determine a new policy and have network device 102 enforce it. Thus, when changes occur, network device 102 can adjust its power management accordingly. This may be important because it is undesirable to have network device 102 in a lower power mode during high usage. Also, to save power, network device 102 should be in a lower power mode when periods previously defined as high usage become periods of low usage. Thus, particular embodiments react to changes in the traffic patterns automatically.

Figure 3:
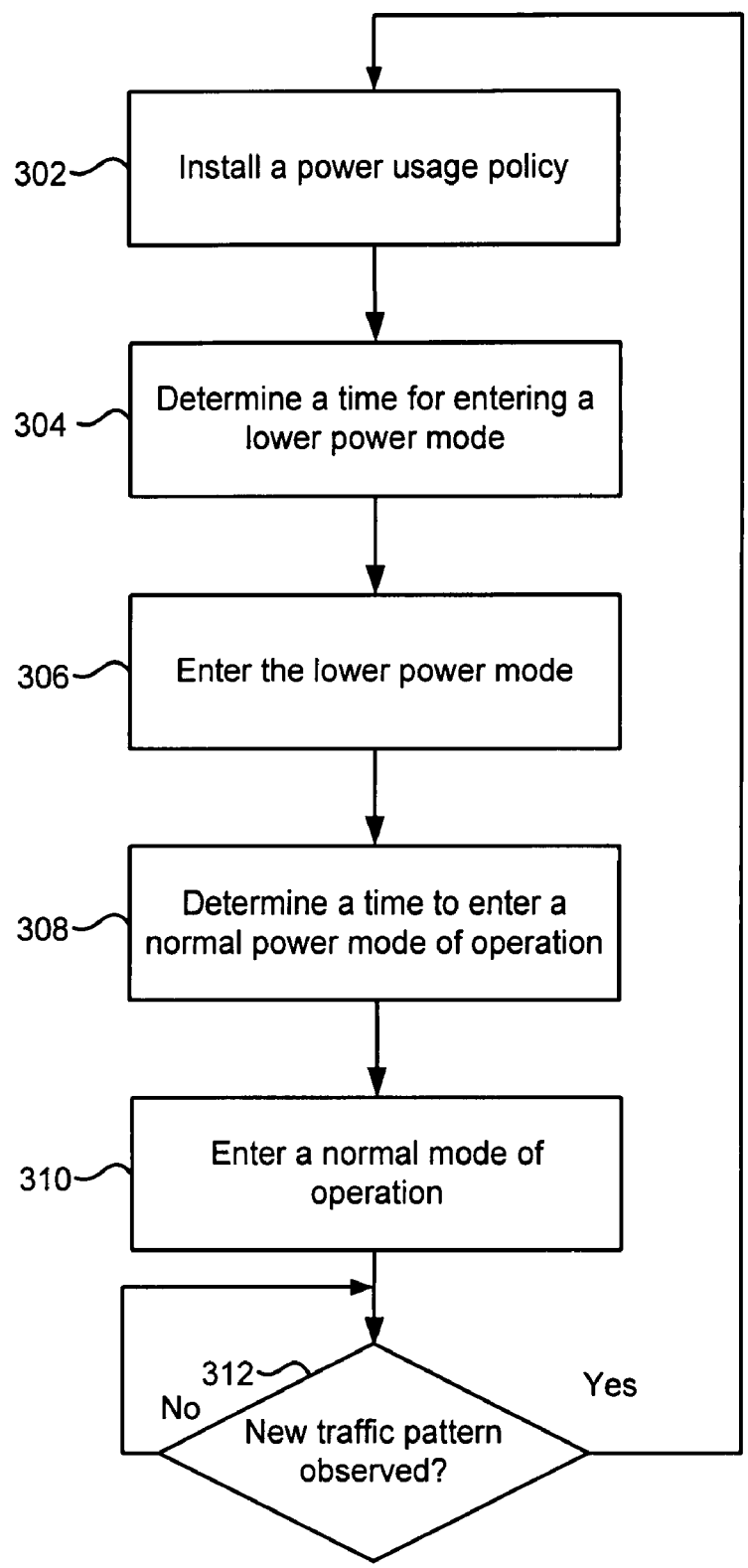
FIG. 3 depicts an example of enforcing a power usage policy at a network device.

FIG. 3 depicts an example of enforcing a power usage policy at network device 102. Step 302 installs a power usage policy. For example, a power usage policy may be received from traffic pattern analyzer 104 and be installed. By installing the policy, network device 102 uses data in the policy to alter its power management. For example, network device 102 may dynamically determine when it needs to move to a lower power mode and when it needs to be in a regular power mode based on traffic patterns.

In step 304, network device 102 determines a time for entering a lower power mode. For example, the policy may specify that at 9:00 a.m. network device 102 should enter into a lower power mode of operation. Also, the pattern may indicate lower usage, and network device 102 determines it should go into a lower power mode.

In step 306, network device 102 enters the lower power mode. In one embodiment, if a spike of network traffic is received during a lower power mode of operation, network device 102 may power up as much as necessary to the maximum power level to service the request. This may be a power override condition. If a power override condition occurs, dynamic re-determination of the traffic pattern may occur to account for the spike in usage, especially if the spike happens multiple times around the same time period. However, a single occurrence of a spike may not cause re-determination of the power usage policy.

In step 308, network device 102 determines a time to enter a normal power mode of operation. For example, at 8:00 a.m. it may be determined that network traffic may start to increase. Thus, in step 310, network device 102 enters a normal mode of operation. In one example, network device 102 may power up to the normal mode before 8:00 a.m. because it may take some time to move from the lower power mode to the normal mode. Thus, at 8:00 a.m., network device 102 is able to handle a normal load rather than starting the powering up process at 8:00 a.m.

Steps 302-310 may be performed continuously as network device 102 determines when to enter into a lower power mode of operation and when to be in a regular power mode of operation.

Step 312 determines if a new traffic pattern is observed. In this case, the traffic patterns of new network traffic through network device 102 may have been further analyzed using additional data. Accordingly, a new power usage policy may have been determined and it is installed and enforced.

Figure 4:
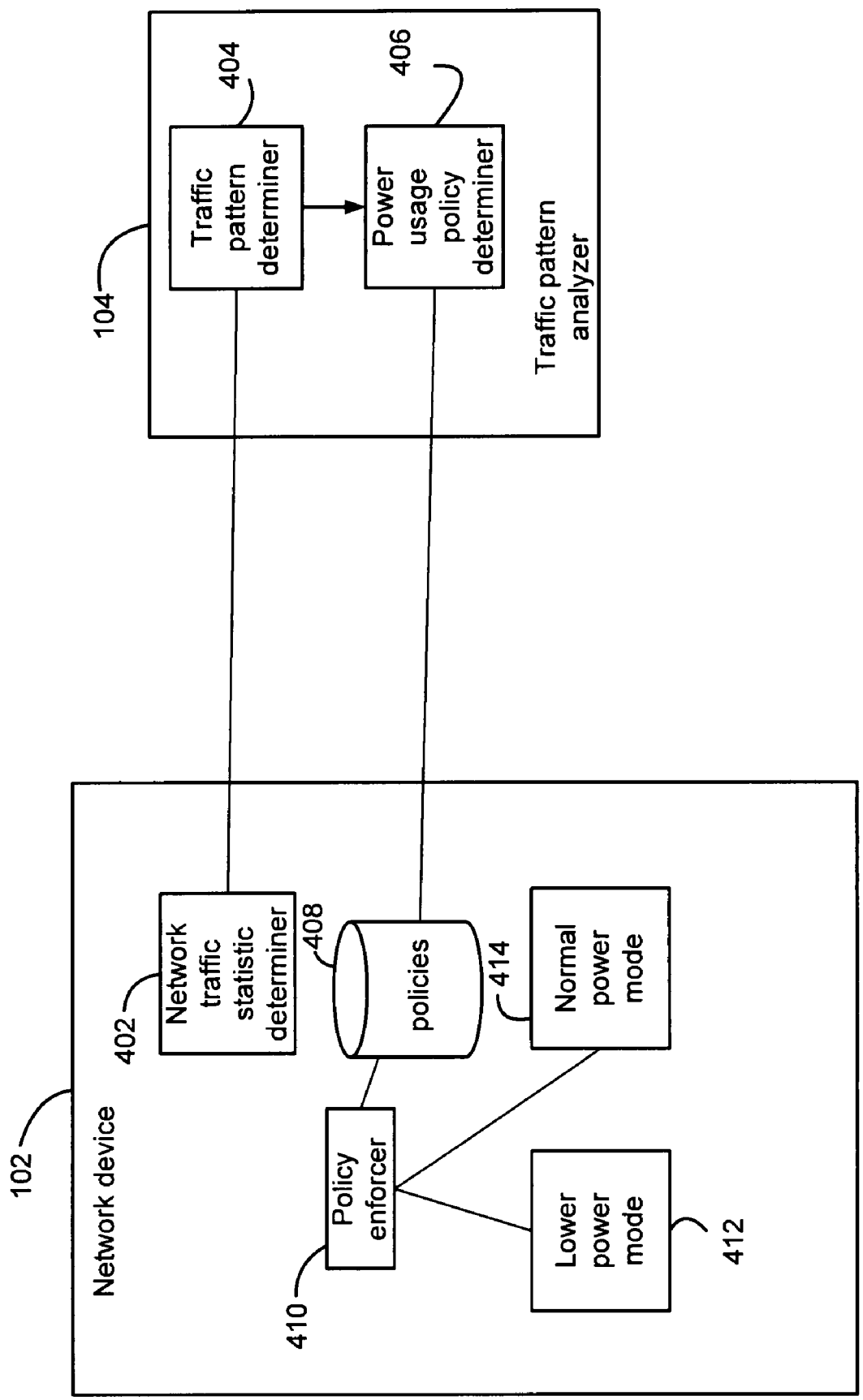
FIG. 4 depicts a more detailed example of the network device and traffic pattern analyzer 104.

FIG. 4 depicts a more detailed example of network device 102 and traffic pattern analyzer 104. A network traffic statistic determiner 402 is configured to determine network traffic that is flowing through network device 102. For example, network traffic statistic determiner 402 may be part of a device that measures packets received and sent by network device 102. This information is sent to a traffic pattern determiner 404 of traffic pattern analyzer 104. Traffic pattern determiner 404 determines traffic patterns that may exist in data. For example, periods of time when traffic flowing through network device 102 is low may be determined.

A power usage policy determiner 406 then determines a power usage policy according to the traffic patterns. For example, when network traffic falls below a certain threshold for a certain amount of time, this may be considered a pattern of low usage. The policy may then indicate that network device 102 should move to a lower power mode of operation. Certain thresholds may be used to determine when to change power modes. For example, if the traffic patterns keep varying significantly in that they indicate network device 102 should operate in a lower power mode of operation for 10 minutes, then a higher power mode of operation for the next 10 minutes, then a lower power mode of operation, and so on, it may not be desirable to continually power down and power up network device 102. This may also use more power than just keeping network device 102 constantly at one power level. Accordingly, power usage policy determiner 406 intelligently determines when an optimal time to power down network device 102 to a lower power mode of operation is desired.

The policy may be sent and stored in a policy database 408. A policy enforcer 410 then reads the policy and enforces it. For example, policy enforcer 410 may cause network device 102 to operate in a lower power mode of operation 412 or a normal power mode of operation 414 depending on the traffic pattern observed. Thus, according to the policy, at certain times, network device 102 is moved from the lower power mode of operation 412 to the normal power mode of operation 414.

Some examples will now be described. In one example, a traffic pattern may be observed for a lack of any meaningful data traffic from Friday evening at 6:00 p.m. to Monday morning at 6:00 a.m. Traffic pattern analyzer 104 may determine this traffic pattern and send it to network device 102 in the form of a message. Network device 102 would then use this information to move to a lower power mode of operation on Friday evening at 6:00 p.m. It would remain in this mode until Monday morning at 6:00 a.m.

In one embodiment, network device 102 may move to the lower power mode by adjusting power options downward to preserve the total amount of power to be used during this time period. Also, network device 102 would power up before 6:00 a.m. so that it would be at a normal power mode of operation once 6:00 a.m. occurs. Accordingly, the traffic pattern is used to determine when to power up before a time when a large amount of data may be received and have to be processed and transferred. Accordingly, network device 102 can anticipate from the traffic patterns when high amounts of traffic may be received and thus be at a full power mode of operation when that time occurs.

In another example, traffic pattern analyzer 104 sends a message to network device 102 indicating that there is a traffic pattern of little or no traffic from 7:00 p.m. to 6:00 a.m. on week nights and from Friday at 6:00 p.m. to Monday at 6:00 a.m. Network device 102 would then implement a policy in which it is in a lower power mode of operation during those times. This saves an administrator from statically configuring network device 102 to be in a lower power mode of operation. Further, network device 102 may be dynamically reconfigured as historical patterns change. For example, at some point, a company may decide that a back-up should be run at 2:00 a.m. Also, certain projects may be started in which computing resources may be used at different times, such as during the night. Traffic pattern analyzer 104 may automatically detect this and determine different traffic patterns for different time periods. For example, network device 102 may then be configured to operate in the normal power mode at 2 a.m. when the backup starts. Thus, network device 102 may be automatically reconfigured to operate in the lower power mode of operation at different times.

In another embodiment, network device 102 may include different blades within a chassis. In this case, any blade in the chassis may have its own compute infrastructure, such as a personal computer on a blade. Each blade may be sent a message to go into a lower power mode of operation based on traffic patterns observed in the chassis. Accordingly, each blade may be configured with different policies. This saves power for the chassis as a whole, but also for individual blades, which may be servicing different traffic.

In another example, based upon the correlated information (from one or more devices) about power usage, a company may sell/share/exchange the historical information with a utility provider. The information might allow the utility to better manage their power infrastructure, especially during rolling-blackouts or brownouts, etc. For example, the utility may reduce power being provided to companies during times that show historical patterns of low usage.

Particular embodiments provide many advantages. For example, by analyzing historical traffic patterns, network devices 102 may be powered down to a lower power mode of operation at optimal times when performance may not be affected. This may save an entity money in power usage. Also, network device 102 may be powered up to be at a full power mode of operation at a time when network traffic may be considered high. Thus, particular embodiments anticipate when data traffic may be heavy and accordingly have network device 102 in a maximum power mode of operation.

Also, particular embodiments continually analyze network traffic to dynamically adjust a power usage policy. Thus, this may be more efficient than static policies which may be configured by a user and not changed. Also, the policies may be more exact and are based on actual data. This may be important as network traffic changes. It is not expected that network traffic will remain the same because network devices 102 may experience different data traffic according to different conditions. Thus, the dynamic reconfiguration of the power usage policy is necessary to efficiently save power at network device 102.

Although the description has been described with respect to particular embodiments thereof, these particular embodiments are merely illustrative, and not restrictive. Although a network device is described, network devices may also include any device that processes data.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that which is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   determining network traffic statistics for traffic flowing through a network device;
   providing the network device with traffic pattern information based on the network traffic statistics for traffic flowing through the network device, the traffic pattern information allowing for power usage management to be performed where the network device operates in a lower power mode when the traffic pattern information indicates a traffic pattern associated with lower usage; and
   dynamically providing the network device with updated traffic pattern information based on new network traffic statistics to allow the network device to adjust its power usage management.

2. The method of claim 1, further comprising determining a traffic pattern including one or more periods of lower traffic flow and one or more periods of higher traffic flow.

3. The method of claim 2, further comprising determining a power usage policy to cause the network device to operate in the lower power mode during the one or more periods of lower traffic flow and to cause the network device to operate in a higher power mode during the one or more periods of higher traffic flow based on the network traffic statistics.

4. The method of claim 1, wherein determining the network traffic statistics comprises receiving the network statistics at a second network device separate from the network device, wherein the second network device provides the traffic pattern information.

5. The method of claim 1, wherein dynamically providing the network device with updated information comprises:
   receiving new network traffic statistics;
   determining new traffic pattern information based on the new statistics; and
   providing the new traffic pattern information to the network device.

6. The method of claim 1, wherein the lower power mode comprises a lower power level from a normal power level.

7. The method of claim 1, wherein providing the network device with traffic pattern information and dynamically providing the network device with updated traffic pattern information is performed by a traffic analyzer that is found in the network device or is separate from the network device.

8. A method comprising:
   determining network traffic statistics for traffic flowing through a network device;
   determining traffic pattern information, the traffic pattern information determined based on the traffic flowing through the network device;
   performing power usage management by operating in a lower power mode during one or more first time periods when the traffic pattern information indicates a traffic pattern associated with lower usage and operating in a higher power mode during one or more second time periods when the traffic pattern information indicates a traffic pattern associated with higher usage; and
   dynamically changing the power usage management by changing at least one of the one or more first time periods and/or the one or more second time periods of operating in the lower power mode and higher power mode based on new traffic pattern information determined from new network traffic statistics.

9. The method of claim 8, wherein determining the traffic pattern information comprises:
   sending the network traffic statistics to a traffic pattern analyzer; and
   receiving the traffic pattern information from the traffic pattern analyzer.

10. The method of claim 8, further comprising determining a power usage policy to indicate the network device should operate in the lower power mode during the first time period and to indicate the network device should operate in a higher power mode during the second time period.

11. The method of claim 8, wherein dynamically changing the power usage management comprises:
    determining the new network traffic statistics; and
    determining new traffic pattern information based on the new network traffic statistics, the new traffic pattern information including new one or more first time periods when the traffic pattern indicates a traffic pattern associated with lower usage and new one or more second time periods when the traffic pattern indicates a traffic pattern associated with higher usage.

12. The method of claim 8, wherein the lower power mode comprises a lower power level from a normal power level.

13. An apparatus comprising:
one or more processors; and
logic encoded in one or more tangible media for execution by the one or more processors and when executed operable to:
determine network traffic statistics for traffic flowing through a network device;
provide the network device with traffic pattern information based on the network traffic statistics for traffic flowing through the network device, the traffic pattern information allowing for power usage management to be performed where the network device operates in a lower power mode when the traffic pattern information indicates a traffic pattern associated with lower usage; and
dynamically provide the network device with updated traffic pattern information based on new network traffic statistics to allow the network device to adjust its power usage management.

14. The apparatus of claim 13, wherein the logic when executed is further operable to determine a traffic pattern including one or more periods of lower traffic flow and one or more periods of higher traffic flow.

15. The apparatus of claim 14, wherein the logic when executed is further operable to determine a power usage policy to cause the network device to operate in the lower power mode during the one or more periods of lower traffic flow and to cause the network device to operate in a higher power mode during the one or more periods of higher traffic flow based on the network traffic statistics.

16. The apparatus of claim 13, wherein the logic operable to determine the network traffic statistics comprises logic that when executed is further operable to receive the network statistics at a second network device separate from the network device, wherein the second network device provides the traffic pattern information.

17. The apparatus of claim 13, wherein the logic operable to dynamically provide the network device with updated information comprises logic that when executed is further operable to:
receive new network traffic statistics;
determine new traffic pattern information based on the new statistics; and
provide the new traffic pattern information to the network device.

18. The apparatus of claim 13, wherein the lower power mode comprises a lower power level from a normal power level.

19. The apparatus of claim 13, wherein the logic operable to provide the network device with traffic pattern information and dynamically provide the network device with updated traffic pattern information is included in a traffic analyzer that is found in the network device or is separate from the network device.

20. An apparatus comprising:
one or more processors; and
logic encoded in one or more tangible media for execution by the one or more processors and when executed operable to:
determine network traffic statistics for traffic flowing through a network device;
determine traffic pattern information, the traffic pattern information determined based on the traffic flowing through the network device;
perform power usage management by operating in a lower power mode during one or more first time periods when the traffic pattern information indicates a traffic pattern associated with lower usage and operating in a higher power mode during one or more second time periods when the traffic pattern information indicates a traffic pattern associated with higher usage; and
dynamically change the power usage management by changing at least one of the one or more first time periods and/or the one or more second time periods of operating in the lower power mode and higher power mode based on new traffic pattern information determined from new network traffic statistics.

21. The apparatus of claim 20, wherein the logic operable to determine the traffic pattern information comprises logic that when executed is further operable to:
send the network traffic statistics to a traffic pattern analyzer; and
receive the traffic pattern information from the traffic pattern analyzer.

22. The apparatus of claim 20, wherein the logic when executed is further operable to determine a power usage policy to indicate the network device should operate in the lower power mode during the first time period and to indicate the network device should operate in a higher power mode during the second time period.

23. The apparatus of claim 20, wherein the logic operable to dynamically change the power usage management comprises logic that when executed is further operable to:
determine the new network traffic statistics; and
determine new traffic pattern information based on the new network traffic statistics, the new traffic pattern information including new one or more first time periods when the traffic pattern indicates a traffic pattern associated with lower usage and new one or more second time periods when the traffic pattern indicates a traffic pattern associated with higher usage.

24. The apparatus of claim 20, wherein the lower power mode comprises a lower power level from a normal power level.

* * * * *